United States Patent
Heerspink

(10) Patent No.: US 6,866,282 B2
(45) Date of Patent: Mar. 15, 2005

(54) SUPPORT STAND FOR MOTORCYCLE

(76) Inventor: Todd W. Heerspink, 6219 138th Ave., Holland, MI (US) 49423

( * ) Notice: Subject to any disclaimer, the term of this patent is extended or adjusted under 35 U.S.C. 154(b) by 0 days.

(21) Appl. No.: 10/373,010

(22) Filed: Feb. 24, 2003

(65) Prior Publication Data
US 2003/0160423 A1 Aug. 28, 2003

Related U.S. Application Data

(60) Provisional application No. 60/359,355, filed on Feb. 25, 2002.

(51) Int. Cl.[7] .................................................. B62H 3/00
(52) U.S. Cl. ........................... 280/296; 211/20; 211/24
(58) Field of Search ................................. 280/293, 296, 280/299, 302; 211/22, 21, 20, 23, 24

(56) References Cited

U.S. PATENT DOCUMENTS

| | | | | |
|---|---|---|---|---|
| 519,016 A | * | 5/1894 | Clairmont | 211/22 |
| 529,939 A | * | 11/1894 | Nodereer | 211/20 |
| 565,058 A | * | 8/1896 | Westphal | 70/234 |
| 1,750,576 A | * | 3/1930 | Cubberley | 211/11 |
| 3,603,459 A | * | 9/1971 | Erb | 211/20 |
| 4,437,597 A | * | 3/1984 | Doyle | 224/533 |
| 5,735,410 A | * | 4/1998 | Kallstrom | 211/20 |
| 5,749,475 A | * | 5/1998 | Krebs | 211/24 |
| 5,992,645 A | * | 11/1999 | West | 211/19 |
| 6,488,157 B2 | * | 12/2002 | Chen | 211/20 |
| 6,581,785 B1 | * | 6/2003 | Falkenstein | 211/24 |
| 6,640,979 B1 | * | 11/2003 | Mayfield | 211/20 |

* cited by examiner

Primary Examiner—Daniel G. DePumpo
(74) Attorney, Agent, or Firm—Flynn, Thiel, Boutell & Tanis, P.C.

(57) ABSTRACT

A motorcycle support stand has a horizontally large base plate which stably engages a flat floor and mounts thereon a pair of sidewardly spaced uprights which define a gap therebetween for accommodating a motorcycle tire. The uprights have lower ends fixedly securable to the base plate, with at least one upright being slidably adjustable to vary the width of the gap. The upright has a leg part with a curvature similar to the rear tire so as to engage the side of the tire when the uprights are clamped together with the tire.

15 Claims, 6 Drawing Sheets

SUPPORT STAND FOR MOTORCYCLE

CROSS-REFERENCE TO RELATED APPLICATION

This application claims priority under 35 USC §119(e) of copending provisional application Ser. No. 60/359,355 filed Feb. 25, 2002, the entire disclosure of which is herein incorporated by reference.

FIELD OF THE INVENTION

This invention relates to a stand for supporting a two-wheel motorcycle in a generally upright position.

BACKGROUND OF THE INVENTION

Most motorcycles are provided with a collapsible kick stand (i.e. arm) for supporting the motorcycle in an inclined upright position during stationary storage thereof. The kick arm is normally secured at its upper end to a connecting bracket which mounts to the underside of the motorcycle frame centrally between the wheels, with the kick arm being swingable outwardly and downwardly to permit the free end thereof to engage the ground or floor. When in this position, the motorcycle can be supported by the kick arm but is nevertheless disposed in an angled or inclined position relative to the vertical. This orientation of the motorcycle, the substantial size and mass of the motorcycle, and the rather minimal support provided by the kick arm, hence result in the motorcycle being subject to tipping over, particularly when an external force of minimal magnitude is applied thereto. Because of the instability of the motorcycle when it is supported by the kick arm, most motorcycle dealers do not permit prospective customers to sit on motorcycles displayed in the showroom for fear that the motorcycle will tip over. A similar problem exists when motorcycles are stored in garages and the like since the kick arm does not provide the desired degree of safety and stability.

With respect to racing bikes, they are not typically provided with a kick stand, but rather utilize a specialized stand which is positioned adjacent one side of the rear wheel and which, at its upper end, engages the wheel hub. Devices of this type have also proven to be somewhat unstable since they, like a kick stand, also support the motorcycle only from one side and typically do not permit the motorcycle to be maintained in a fully upright position.

Other structures used for supporting a motorcycle are provided principally to permit support of the motorcycle when it is being maintained or serviced. Such devices typically involve low tables which are positioned under the central frame of the motorcycle so as to permit it to be supported in a slightly raised position. Other devices involve lift mechanisms having a pair of wheels so that one wheel of the motorcycle can be positioned on a part of the lift device, with the lift device then being rotated about its wheels so as to permit one wheel of the motorcycle to be lifted upwardly a small extent. These lift devices, intended principally for use when performing maintenance or service on the motorcycle, do not always provide the desired stability and, more specifically, are generally bulky and space-consuming. Further, they require lifting of one of the motorcycle wheels and hence such devices are unsuitable for normal parking or storage of the motorcycle.

It is an object of this invention to provide an improved support stand for a motorcycle, which support stand overcomes or at least minimizes many of the disadvantages associated with prior constructions, as briefly summarized above.

More specifically, the present invention relates to a stand for engaging a wheel of a motorcycle, preferably the rear wheel, to enable the motorcycle to be stably supported in a generally fully upright position while at the same time maintaining both wheels of the motorcycle engaged with the ground or the support stand. The support stand readily accommodates a wide range of different width motorcycle tires as associated with most full size motorcycles, and permits the operator to wheel the motorcycle directly into or out of the support stand to facilitate use thereof. At the same time the support stand is small and compact, can be positioned stably and securely on generally any flat surface, is light-weight and portable, and enables stable upright support of the motorcycle so as to permit a person to sit on the motorcycle while it is engaged with the stand.

In the motorcycle support stand of the present invention, there is provided a horizontally large base plate which stably engages a flat floor or surface, and this base plate mounts thereon a pair of sidewardly spaced uprights which define a gap or space therebetween for accommodating the tire of a motorcycle. The uprights have lower ends thereof fixedly securable to the base plate, with at least one and preferably both uprights being slidably adjustable toward and away from one another to vary the width of the tire-receiving gap. The upright has a leg part which projects upwardly and has a significant arcuate curvature which resembles the curvature of the rear tire so as to engage the side of the tire when the uprights are clamped together in close association with the tire. The uprights adjacent upper ends thereof are joined by a strap or other connecting device, preferably of adjustable length, to stabilize the uprights adjacent the upper ends thereof and to prevent the tire from moving rearwardly from the gap.

Other objects and purposes of the invention will be apparent to persons familiar with constructions of this general type upon reading the following specification and inspecting the accompanying drawings.

Figure 1:
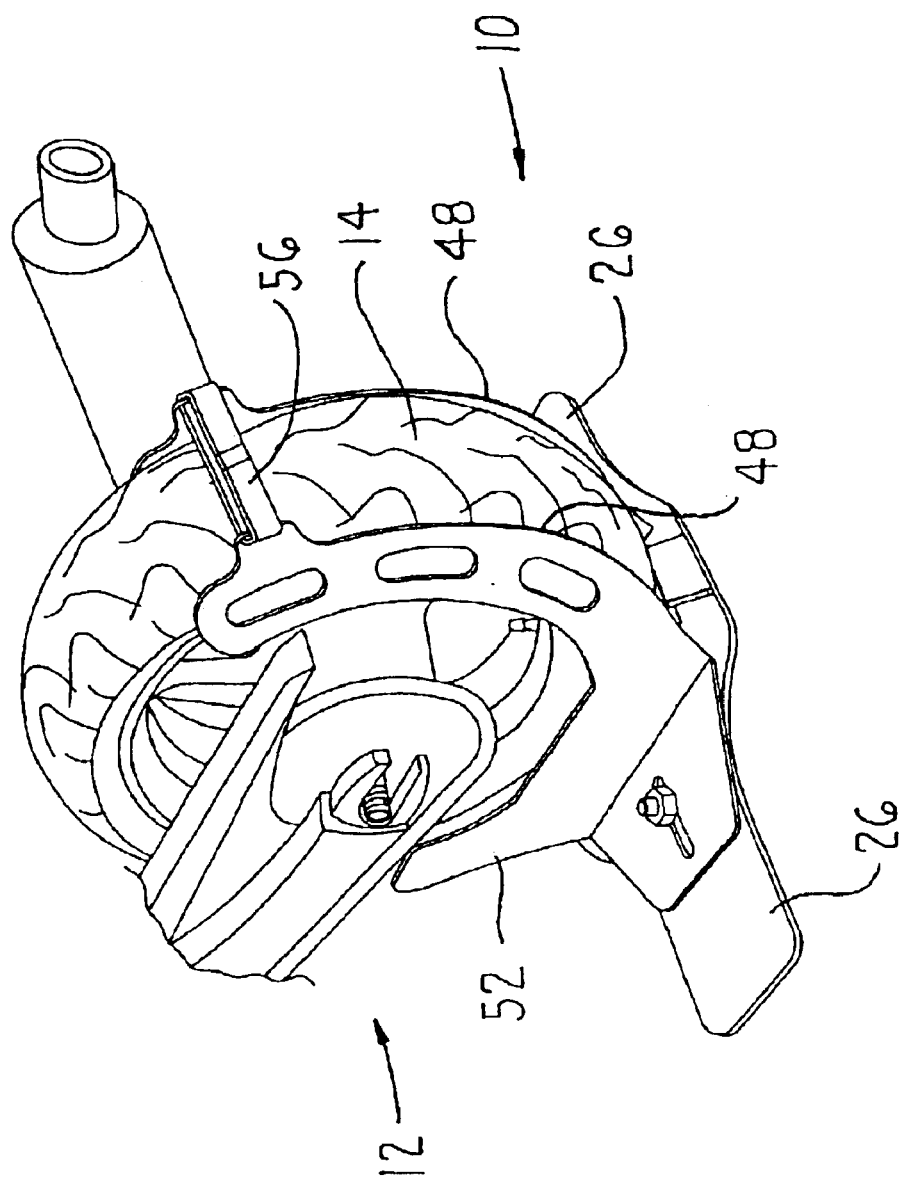
FIG. 1 is a perspective view of the support stand of the present invention and showing the rear wheel of a motorcycle supportingly positioned therein.

In the following description, certain terminology will be used to facilitate description of the invention but will not be limiting. For example, the words "rightwardly", "leftwardly", "upwardly" and "downwardly" will refer to directions in the drawings to which reference is made. The words "upwardly" and "downwardly" will also refer to the normal positional relationship of the support stand and its cooperation with the wheel of a motorcycle. The words "forward" and "front" will refer to the side of the support stand which enables the wheel of the motorcycle to be inserted therein, and the words "rearward" and "back" will refer to the opposite side of the support stand. The words "inwardly" and "outwardly" will refer to directions toward and away from, respectively, the geometric center of the support stand and designated parts thereof. Said terminology will include the words specifically mentioned, derivatives thereof, and words of similar import.

DETAILED DESCRIPTION

Figure 2:
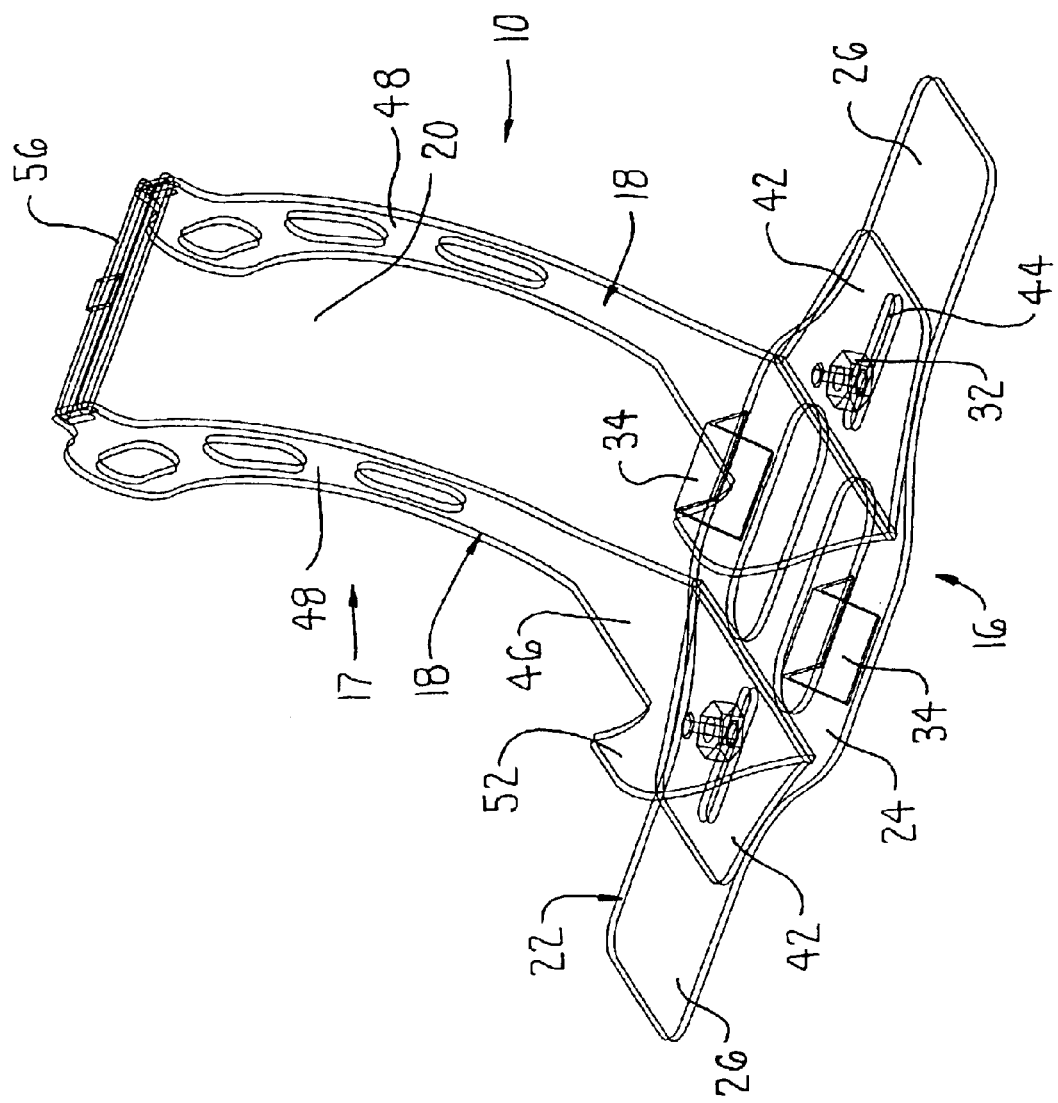
FIG. 2 is a perspective view of the support stand in an empty condition.
Figure 3:
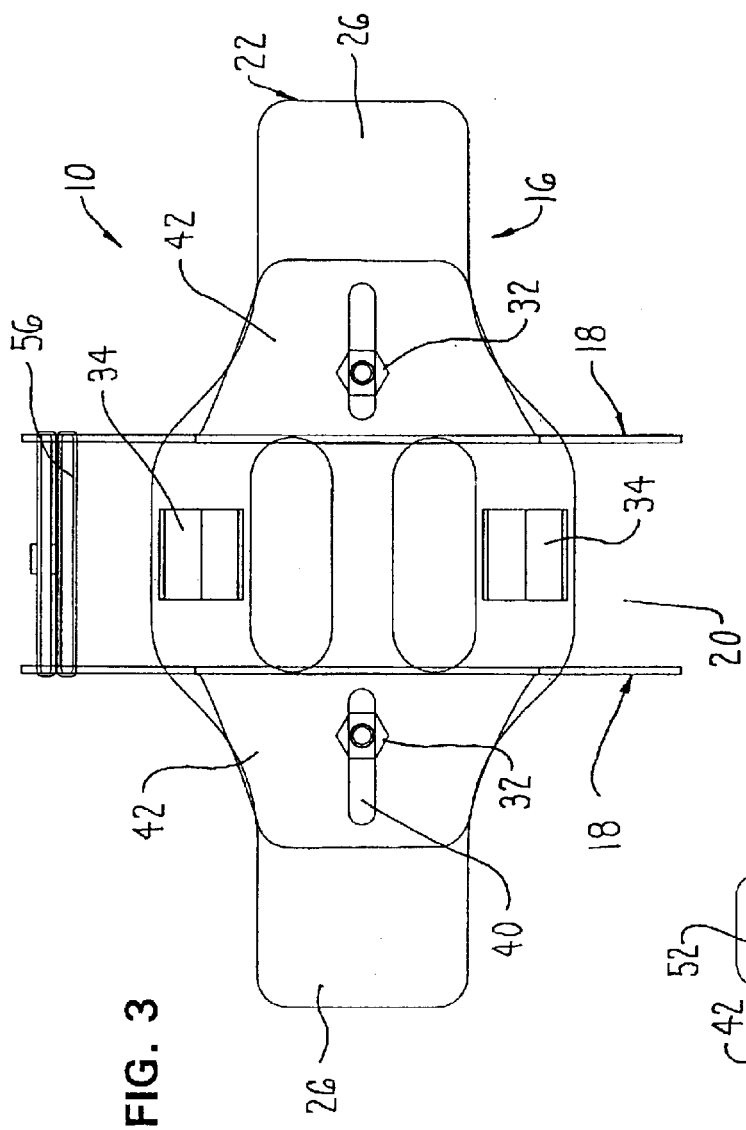
FIG. 3 is a top view of the assembled support stand.
Figure 4:
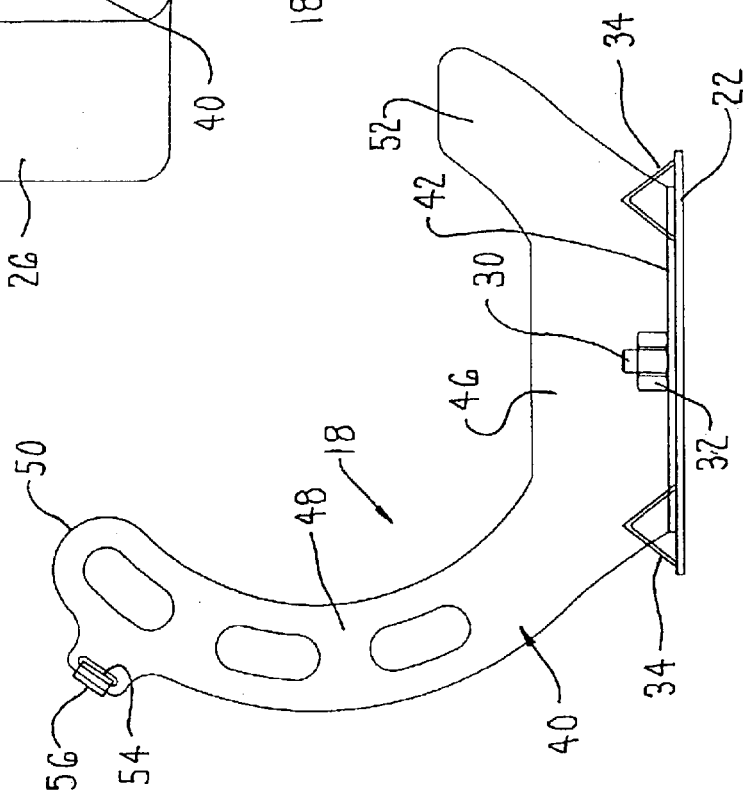
FIG. 4 is a side view of the assembled support stand.
Figure 5:
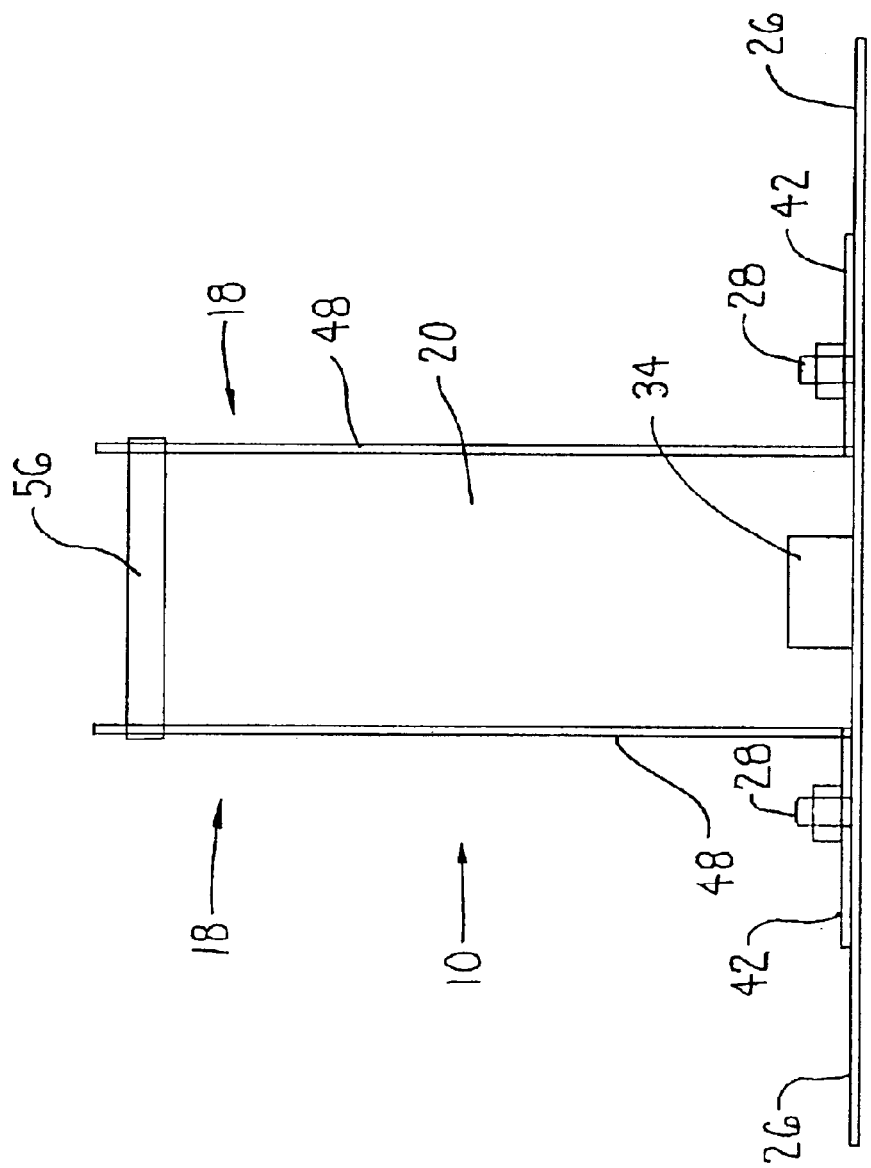
FIG. 5 is a front view of the assembled support stand.

Referring to FIGS. 1 and 2, there is illustrated a motorcycle support stand 10 according to the present invention. The stand 10 is intended for cooperation with a tire such as the rear tire 14, of a conventional two-wheel motorcycle 12 so as to supportingly engage the rear tire 14 to hence maintain the motorcycle 12 in a stationary and stable upright position without requiring utilization of any other supporting structures such as a kick stand or other device.

As illustrated in FIGS. 2–5, the stand 10 includes a horizontally large base 16 which is intended to be supportingly engaged on a generally flat and horizontally large support surface such as a floor or the ground. The base 16 mounts thereon an upwardly cantilevered upright structure 17 which is defined by a pair of sidewardly spaced uprights 18 which project upwardly from the base in approximately parallel relationship so as to define a tire-accommodating gap or space 20 therebetween. This tire-accommodating gap 20, as it projects upwardly from the base 16, is wholly open on the front side thereof so as to permit the rear tire of the motorcycle to be readily moved into or out of the gap.

Figure 6:
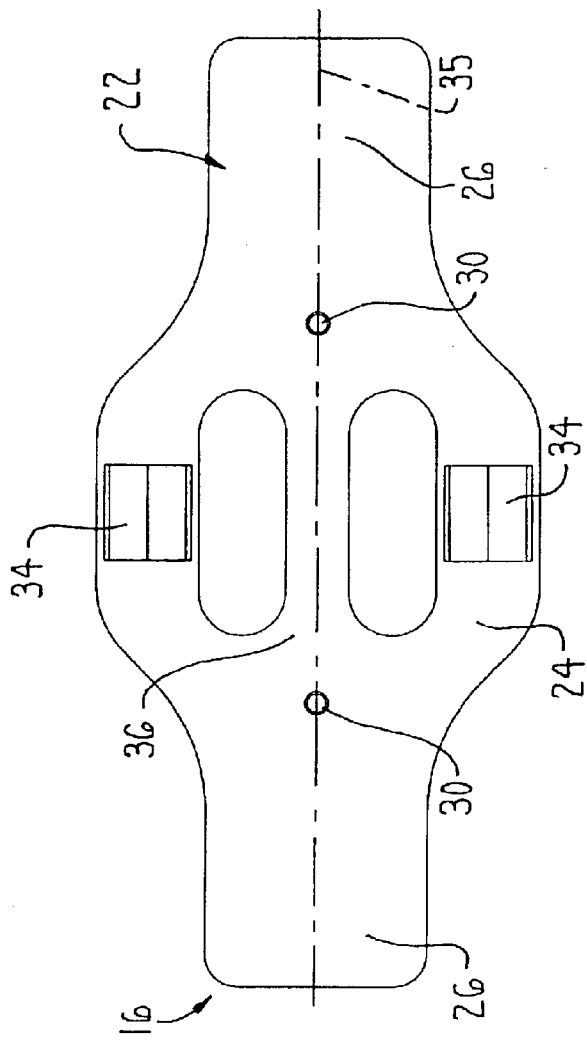
FIG. 6 is a plan view of solely the base of the support stand.
Figure 8:
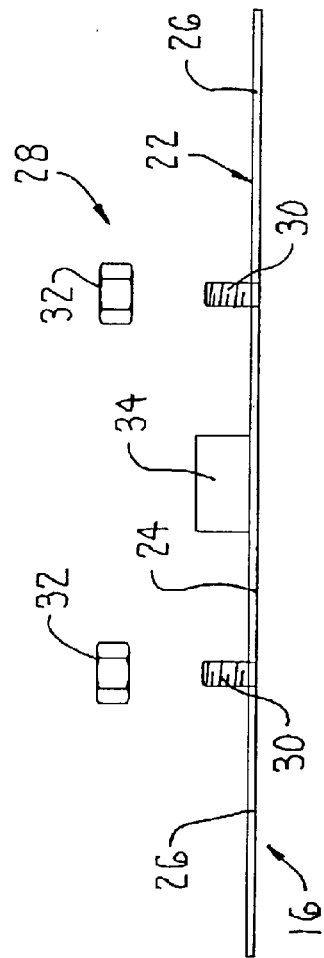
FIG. 8 is a side view of the base shown in FIG. 6.
Figure 7:
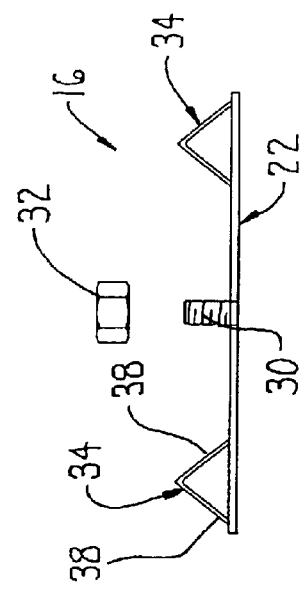
FIG. 7 is a front view of the base shown in FIG. 6.

Considering the construction of the base 16 and referring specifically to FIGS. 6–8, the base 16 is defined principally by a large and horizontally-extending platelike base member 22 which, for simplicity and efficiency of construction, is preferably formed in one piece from a flat metal plate, such as a steel plate of about one-fourth to three-eighths inch thickness. The base member 22 has a main center part 24 disposed between and generally horizontally coextensive with a pair of wing or leg parts 26 which are cantilevered outwardly from opposite sides of the main center part 24. The base member 22 hence has a horizontal dimension in the sideward or transverse direction of the support stand which is substantially greater than the horizontal dimension of the plate member as defined in the front-to-back direction thereof (i.e., the horizontal dimension defining the width of the main center part 24).

The base 16 also includes a fastener 28 associated with each of the platelike leg parts 26. The fastener 28 is intended for cooperation with a respective one of the uprights 18, as described hereinafter.

The fastener 28 in the illustrated embodiment comprises a stud or rod 30 which is fixed to the respective leg part 26, such as by being inserted into a hole formed in the leg part and then welded thereto. The rod 30 projects upwardly a limited extent above the leg part 26 and is provided with threads on the exposed upper end thereof. A nut 32 is rotatably and threadably engaged with the exposed threaded upper portion of each rod 30.

The base 16 further includes a pair of tire retainers 34 which are fixed to and project upwardly from the upper surface of the main center plate part 24. The tire retainers 34 are elongated in the sideward or transverse direction of the support stand, and have a length so as to extend transversely across a significant width of the tread of a typical motorcycle tire. The retainers 34 extend in generally parallel relationship, and are spaced apart in the front-to-back direction of the support stand so as to be disposed generally equal distances on opposite sides of a sidewardly extending centerline 35 of the base. The spacing between the tire retainers 34 is selected so as to define therebetween a flat contact area 36 on the upper surface of the main center plate part 24. This contact area 36 provides supportive engagement with the bottom of the motorcycle tire 14 when the latter is engaged within the gap 20 of the support stand. The transverse spacing between the tire retainers 34, at the same time, is selected so that these retainers substantially engage adjacent portions of the outer periphery of the tire tread on opposite sides of the contact area 36 to provide stable but nonrolling support of the tire.

In the illustrated and preferred embodiment, the tire retainers 34 are defined by generally triangular cross-sectional elements which have one flat side positioned and fixedly secured to the upper surface of the base plate 22, such as by welding, whereby the other angled sides 38 hence are sloped relative to the horizontal to facilitate the movement of the motorcycle tire either into or out of the stand.

Considering now the uprights 18, the two uprights 18 are substantially identical to one another except for being mirror images. Accordingly, only one of the uprights is described herein.

Figure 9:
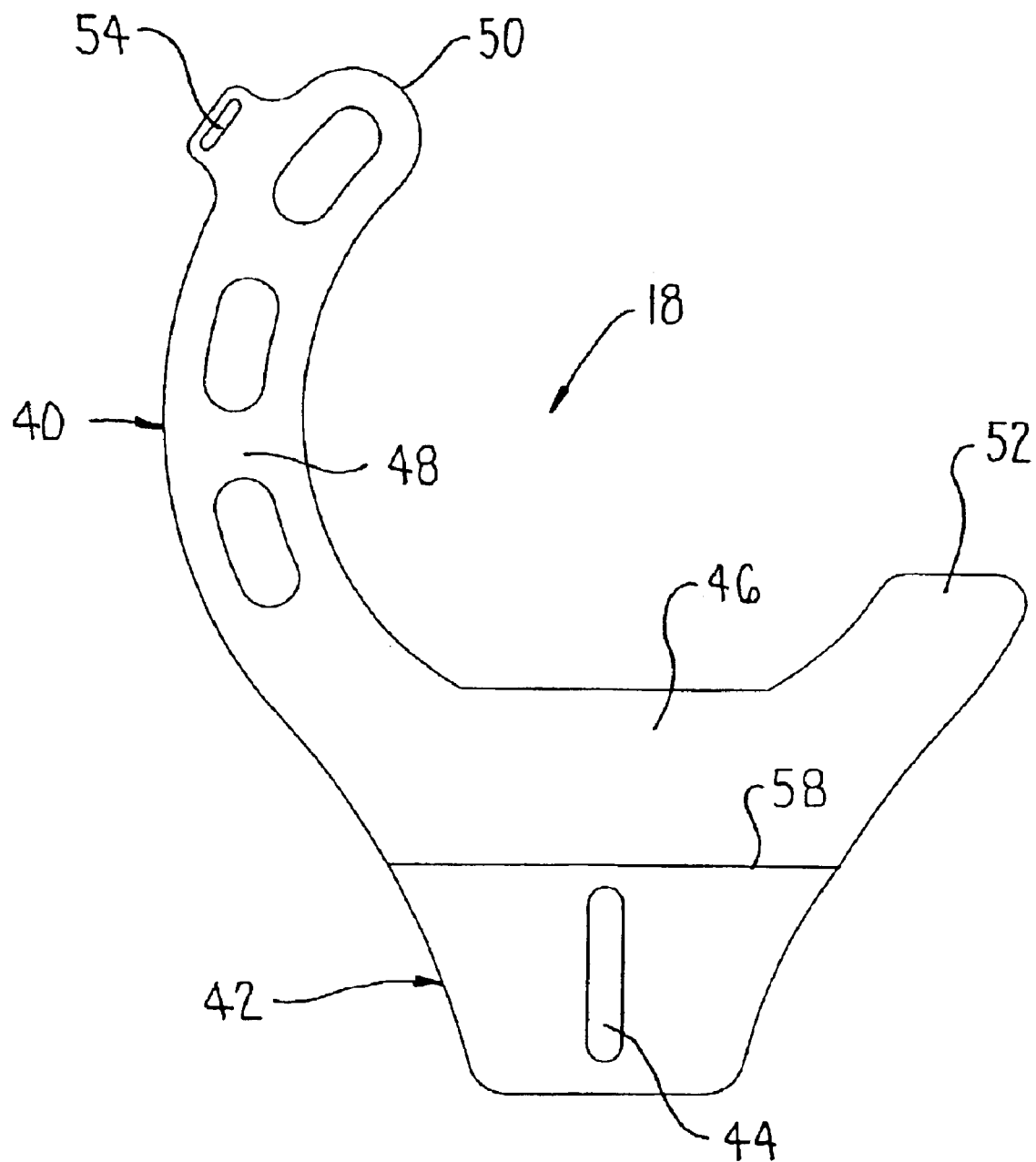
FIG. 9 is a side view showing one of the uprights when in the form of a flat plate, prior to bending of the mounting flange at the lower end thereof.

As illustrated in FIG. 9, the upright 18 is defined by a main upright part 40 which at its lower end is rigidly joined to a mounting flange 42. The flange 42 is cantilevered sidewardly in generally right-angle relationship to the upright part 40, and is adapted to overlie the upper surface of the center plate part 24 of the base member. The mounting flange 42 has a slot 44 extending therethrough, which slot 44 is horizontally elongated generally along the transverse centerline 35 of the stand. Slot 44 permits the fastener rod 30 to project upwardly therethrough, with the nut 32 being engaged with the rod and disposed above the upper surface of the mounting flange to permit securement of the upright 18 to the base 16.

The upright part 40 has a somewhat u-shaped configuration defined by a lower part 46 which extends generally in the front-to-rear direction of the base member and projects upwardly therefrom through only a small extent. This lower part 46, adjacent the rearward end thereof, joins to a main rear leg 48 which is cantilevered upwardly through a significant extent so as to terminate at an upper free end 50. The leg 48, when viewed from the side of the support stand, has a curved or arcuate configuration, resembling a C-shaped configuration, SO as to generally conform to and hence permit engagement with the side wall of the motorcycle tire 14 when the latter is engaged within the support stand. The upward arcuate projection of the leg 48 is preferably selected to extend through an angular extent in excess of 90°, as shown in FIGS. 1 and 9, such that the upper free end so thereof contacts the side wall of the tire 14 in the rear upper quadrant thereof, i.e., at a location significantly above the rotational axis of the tire, such as at an elevation approximately midway between the tire axis and the upper extremity thereof.

The upright part 40 also includes a short but upwardly cantilevered front leg 52 which is spaced forwardly from the rear leg 48 and projects upwardly only a small extent so as to permit supportive engagement with the side wall of the tire in the lower front quadrant thereof.

The rear leg 48 of each upright, adjacent the rear edge thereof and in the vicinity of the upper end thereof, also has an opening or slot 54 formed therethrough. The slot 54 accommodates therein a connecting strap 56 which extends transversely across the upper rear portion of the wheel-accommodating gap 20 for joining the rear legs 48 of the uprights 18 together to hence prevent the motorcycle tire from being moved rearwardly an excessive amount. The connecting strap 56 in the illustrated embodiment comprises an elongate flexible strap, such as a nylon strap, having a conventional buckle associated therewith so as to permit the length of the strap to be suitably adjusted to hence accommodate the adjustable width of the tire-accommodating gap 20.

The upright 18 of the present invention is, according to a preferred embodiment, initially formed from a flat metal plate, such as a steel plate identical to the steel plate used for forming the base member as described above. The upright 18 is hence cut or formed from the flat steel plate so that the upright part 40 and mounting flange 42 are initially substantially coplanar. The flange part 42 is thereafter bent transversely generally about the bend line 58 so as to project generally horizontally when the upright part 40 projects vertically. In the preferred variation, the included angle defined between the planes of the upright part 40 and flange part 42 may be slightly greater than 90°, such as approximately 92°. Hence, when the uprights 18 are mounted on the base 20, the rear upright legs 48 converge slightly inwardly toward one another as they project upwardly. With this arrangement, insertion of the tire into the gap 20 hence causes the tire to initially engage the upper ends of the gripping legs 48 and cause a slight outward deflection of the legs so that not only do the legs effect engagement with the side wall of the tire over a greater extent, but this also effects greater locking together of the uprights and the base so as to securely retain the vehicle tire between the uprights.

The uprights 18 are also advantageously formed from a rather thin material or construction, such as a metal plate, so as to permit the thin upright adjacent one side of the motorcycle to readily fit into the small clearance space which exists between the rear tire and the muffler.

The flexibility and adjustability of the strap 56 also enables the uprights 18 adjacent the upper ends thereof to slightly deflect outwardly away from one another without being excessively restrained by the strap.

In assembly and operation, the pair of uprights 18 are positioned on the horizontal base so as to project upwardly therefrom, and the threaded fastener rods 30 associated with the base project upwardly through the slots 44 associated with the mounting flanges 42. The nuts 32 are then secured onto the threaded rods to hold the uprights 18 and the base 20 assembled together. So long as the nuts are not tightened against the mounting flanges 42, however, the uprights 18 can be slidably adjusted along the slots so as to either enlarge or narrow the width of the wheel-accommodating gap 20. Either one or both of the uprights 18 can be appropriately slidably moved toward or away from one another to adjust the width of the gap 20, and the connecting strap 56 is preferably engaged across the upper ends of the uprights after the gap has been selectively adjusted, or after the vehicle tire has been initially positioned therein.

The stand 10 is initially used by loosening one or both of the fasteners 28 so as to permit the width of the wheel-accommodating gap 20 to be adjusted. The gap can be adjusted wide enough to permit the rear tire to be rolled into and positioned in the space defined between the uprights 18. The uprights 18 are then slidably urged inwardly so as to be positioned in snug engagement with opposite sides of the tire, and the fasteners 28 are then tightened to secure the uprights in position. This hence defines the proper width of the tire gap 20, and permits the stand 10 to be repetitively utilized without readjustment so long as it is being used with the same size motorcycle tire. The operator can then merely roll the rear tire of the motorcycle into the gap 20 by rolling it upwardly over the front tire retainer 34 so that the bottom of the tire engages the central area 36 on the base member, and the tire retainers 34 effectively straddle this contact area and provide sufficient positive retention of the tire within the stand, particularly in view of the additional frictional contact between the uprights and the tire side walls, so as to prevent the tire from being accidentally rollingly dislodged from the stand. Conversely, when use of the motorcycle is desired, the operator merely rolls the motorcycle forwardly so as to effect disengagement from the stand. If the operator should accidentally roll the motorcycle rearwardly while engaged within the stand, the rear strap 56 functions as a stop and prevents the tire from rolling rearwardly, and the worst case scenario in this situation would be that the stand would merely slide along the floor, provided that the stand has not been fixedly secured to the floor.

With the improved stand 10 of this invention, and specifically when the rear tire 14 is engaged therewith in the manner described above, the motorcycle is maintained in a stable upright position such that a person can be seated on the motorcycle without effecting tipping thereof since the upright disposition of the motorcycle is substantially free of any significant lean or tilt.

The stand 10 of this invention can be easily and economically manufactured since the uprights 18 and the base member 22 can all be formed from conventional steel plate of generally uniform thickness. The resulting structure when assembled is strong and durable, and yet at the same time is of reasonably small and compact size, and of reasonably light weight so as to permit it to be readily transported or moved about if desired. When in use, the stand does not require fixed securement to the floor since the large base thereof, and the cooperation of the uprights with the motorcycle tire, provide the necessary strength and stability to prevent tipping of the motorcycle. The stand can be fixed to the floor, however, if desired, by providing the leg parts of the base with suitable fasteners such as bolts or the like projecting through openings in the leg parts for engagement with the supporting floor.

When the stand is used in a commercial environment such as a motorcycle dealer showroom, the stand can be readily adjusted with respect to the width of the tire gap so as to accommodate a wide range of different types of motorcycles. Since most motorcycles of full size traditionally use tires of very similar diameter, interchanging of the uprights is not necessary.

While the stand 10 as described above and as illustrated in the accompanying drawings represents a preferred construction, it will nevertheless be recognized that the shape of the stand or of parts thereof, and the construction thereof with respect to details of the various parts, can be modified without departing from the essential structural and functional relationships thereof which are apparent from the above description and drawings.

While the above description relates primarily to the manner of engagement of the stand with the rear tire of a motorcycle so as to maintain the motorcycle in a stable upright condition, i.e., a straight-up position, the stand of the present invention also functions in the same manner for engagement with the front tire of the motorcycle.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. A support stand adapted to be stationarily and stably supported on a generally horizontally extending support surface for supporting a tire of a motorcycle to maintain the motorcycle in a stationary upright position, said support stand comprising:

a horizontally extending base member having a generally flat center contact area adapted to be engaged with the bottom side of a motorcycle tire, and also having a pair of horizontally extending leg parts which are joined to and project outwardly from opposite sides of the center contact area for providing stable and non-tipping supportive engagement with the support surface;

a pair of tire-engaging uprights mounted adjacent opposite sides of said center contact area and projecting in cantilevered relationship upwardly from said base member so as to define a tire-accommodating space therebetween which opens both upwardly and forwardly relative to the support stand, each said upright having a lower flange which projects transversely and overlies the base member;

a fastening structure cooperating between the uprights and the base member for permitting the uprights to be fixed with respect to the base member to define the tire-accommodating space between the uprights of predetermined width, said fastening structure permitting at least one of the uprights to be moved relative to the base either toward or away from the other upright to adjust the width of the tire-accommodating space;

said fastening structure including a releasable fastening device which cooperates between the flange and the base member to permit each of the uprights to be transversely moved with respect to the base member to vary the width of the tire-accommodating space; and said base member having a pair of tire-retaining members fixed thereto and projecting upwardly a small distance from the upper surface adjacent front and rear sides of the center contact area to assist in retaining the tire therebetween;

whereby when the tire is disposed within the tire-accommodating space the opposite side walls of the tire are substantially engaged with the uprights and the lower part of the tire is engaged with the center contact area of the base member so as to impose at least part of the weight of the motorcycle as applied to the tire directly onto the base member.

2. A support stand according to claim 1, wherein said flanges on said uprights project outwardly in opposite directions away from said center contact area.

3. A support stand according to claim 2, wherein each said upright includes a flat platelike upright part which is cantilevered upwardly and which has a respective said flange defined by a generally platelike horizontal leg part which is rigidly joined to a lower end of said platelike upright part and projects transversely outwardly so as to directly overlie and contact an upper surface of said base member.

4. A support stand adapted to be stationarily and stably supported on a generally horizontally extending support surface for supporting a tire of a motorcycle to maintain the motorcycle in a stationary upright position, said support stand comprising:

a horizontally extending base member having a center contact area adapted to be engaged with the bottom side of a motorcycle tire, and also having a pair of horizontally extending leg parts which are joined to and project outwardly from opposite sides of the center contact area for providing stable and non-tipping supportive engagement with the support surface;

a pair of tire-engaging uprights mounted adjacent opposite sides of said center contact area and projecting upwardly from said base member so as to define a tire-accommodating space therebetween which opens forwardly relative to the support stand;

an adjusting structure cooperating with at least one of the uprights for permitting the width of the tire-accommodating space between the uprights to be adjusted to accommodate the width of the tire, the adjusting structure including a releasable fastening device which cooperates between said one upright and said base member to permit said one upright to be transversely moved with respect to the base member to vary the width of the tire-accommodating space; and said base member having a pair of tire-retaining members fixed thereto adjacent front and rear sides of said center contact area and projecting upwardly a small distance for assisting in retaining the tire therebetween;

whereby when the tire is disposed within the tire-accommodating space the opposite side walls of the tire are sidewardly held between the uprights and the lower part of the tire is engaged with the center contact area of the base member so as to impose at least part of the weight of the motorcycle as applied to the tire directly onto the base member.

5. A free-standing support stand adapted to be stationarily and stably supported in a free-standing manner on a generally horizontally extending floor for supporting a tire of a motorcycle to maintain the motorcycle in a stationary upright position, said free-standing support stand comprising:

a horizontally extending base member maintained in supportive but non-fixed engagement with a floor, said base member having a center contact area adapted to be directly engaged with a bottom side of a motorcycle tire and a pair of horizontally extending leg parts joined to and projecting outwardly from opposite sides of the center contact area for providing stable and non-tipping supportive engagement with the floor;

a pair of tire engaging uprights mounted adjacent opposite sides of said center contact area and cantilevered upwardly from said base member to define a tire-accommodating space therebetween which opens forwardly relative to the support stand to enable a tire of the motorcycle to be rolled into the space for contact with the center contact area;

said uprights having sidewardly spaced lower end portions fixedly positioned adjacent opposite sides of said center contact area so that a lower portion of the tire, where it engages said center contact area, is closely sidewardly confined between said lower end portions;

said uprights also having sidewardly spaced upper end portions defining thereon opposed inner side surfaces for sidewardly engaging the tire therebetween at a location above the elevation of the rotational axis of the tire;

an adjusting structure cooperating with at least one of the uprights for permitting the width of the tire-accommodating space between the uprights to be adjusted to accommodate the width of the tire; and each said upright being defined by a generally L-shaped platelike member having a vertical platelike part cantilevered upwardly and which at a lower end thereof is rigidly joined to a generally horizontal platelike part which overlies and engages the base member and is cantilevered away from the center contact area, the horizontal platelike part associated with said one upright being releasably fixed to said base member by said adjusting structure so as to be positionally adjusted sidewardly toward or away from said center contact area;

the motorcycle tire being positionable within the tire-accommodating space with opposite side walls of the tire above the rotational axis thereof being sidewardly held between the upper end portions of the uprights and a lower part of the tire being engaged with the center contact area of the base member to impose at least that part of the weight of the motorcycle associated with said tire directly onto the base member.

6. A support stand according to claim 5, wherein front arid rear abutments are fixed to and project upwardly from said base member adjacent front and rear edges of said center contact area for retaining the tire therebetween.

7. A combination including:

a motorcyle having front and rear wheels each including a tire; and an upright support stand freely but stationarily and stably supported on a generally horizontal floor for supporting one said tire of said motorcycle so that the support stand, solely by itself, maintains the motorcycle in an upright position, said support stand comprising:

a horizontally large platelike base member disposed on said floor, said base member having an upwardly facing center contact member for engaging a bottom surface of said one tire, the base member having wing parts which project horizontally outwardly through substantial distances in opposite directions away from opposite sides of said center contact area, the wing parts extending generally parallel to the rotational axis of said one tire to provide sideward anti-tip stability to the support stand;

a pair of vertically elongate uprights positioned adjacent and engaging opposite sides of said one tire when the latter is supported vertically on said center contact area, said uprights having lower end portions fixed to said base member adjacent opposite sides of said center contact area and projecting upwardly therefrom in generally parallel and cantilevered relation to define a sideward space therebetween which generally corresponds to the width of said one tire, said space being opened on at least a front side to permit said one tire to be moved thereinto; and front and rear tire-retaining abutments fixed to and projecting upwardly from said base member adjacent front and rear sides of said center contact area;

whereby said one tire of the motorcycle is engaged with the support stand so that the bottom surface of the tire is disposed directly on the center contact area and opposite sides of the tire are supportingly engaged with inner surfaces of the uprights for stably maintaining the motorcycle in a stationary upright position.

8. A combination according to claim 7, wherein a flexible tension strap extends transversely across said space and is joined to said pair of uprights adjacent upper ends thereof to restrict sideward separation between said uprights.

9. A combination according to claim 7, wherein at least one said upright is movable relative to the base member to vary the width of the space between the uprights to accommodate a tire of different width, and a releasable fastener cooperating between the base member and the movable upright for creating a fixed securement therebetween.

10. A combination according to claim 7, wherein said uprights adjacent upper ends thereof have opposed inner side surfaces disposed for engaging opposed side faces of said one tire at a location spaced vertically above and horizontally from the axis of rotation of said one tire.

11. A combination according to claim 7, wherein each said upright is formed from a flat platelike member which is deformed into an L-shape having a vertical plate part projecting upwardly and a horizontal plate part which is joined to a lower end of the vertical plate part and is disposed in overlying engaged relationship with a top surface of the base member, the horizontal plate part being cantilevered outwardly away from the center contact area.

12. A combination according to claim 7, wherein said upright has a generally U-shaped upwardly oriented configuration and includes rear and front vertically-elongated legs which project upwardly in spaced but generally coplanar relationship, said rear leg projecting upwardly through a significantly greater vertical extent than said front leg, whereby the rear and front legs sidewardly engage the side wall of the tire at respective upper rear and lower front quadrants thereof.

13. A free-standing support stand adapted to be stationarily and stably supported in a free-standing manner on a generally horizontally extending floor for supporting a tire of a motorcycle to maintain the motorcycle in a stationary upright position, said free-standing support stand comprising:

a horizontally extending base member maintained in supportive but non-fixed engagement with a floor, said base member having a center contact area adapted to be directly engaged with a bottom side of a motorcycle tire and a pair of horizontally extending leg parts joined to and projecting outwardly from opposite sides of the center contact area for providing stable and non-tipping supportive engagement with the floor;

a pair of tire engaging uprights mounted adjacent opposite sides of said center contact area and cantilevered upwardly from said base member to define a tire-accommodating space therebetween which opens forwardly relative to the support stand to enable a tire of the motorcycle to be rolled into the space for contact with the center contact area;

said uprights having sidewardly spaced lower end portions fixedly positioned adjacent opposite sides of said center contact area so that a lower portion of the tire, where it engages said center contact area, is closely sidewardly confined between said lower end portions;

said uprights also having sidewardly spaced upper end portions defining thereon opposed inner side surfaces for sidewardly engaging the tire therebetween at a location above the elevation of the rotational axis of the tire;

each said upright having an arcuate shape as it projects upwardly from said center contact area, the arcuate shape of the upright extending through an angular extent in excess of 90° and substantially corresponding to the arcuate shape defined by a side of the tire to facilitate engagement with opposite sides of the tire; and an adjusting structure cooperating with at least one of the uprights for permitting the width of the tire-accommodating space between the uprights to be adjusted to accommodate the width of the tire;

the motorcycle tire being positionable within the tire-accommodating space with opposite side walls of the tire above the rotational axis thereof being sidewardly held between the upper end portions of the uprights and a lower part of the tire being engaged with the center contact area of the base member to impose at least that part of the weight of the motorcycle associated with said tire directly onto the base member.

14. A free-standing support stand adapted to be stationarily and stably supported in a free-standing manner on a generally horizontally extending floor for supporting a tire of a motorcycle to maintain the motorcycle in a stationary upright position, said free-standing support stand comprising:

- a horizontally extending base member maintained in supportive but non-fixed engagement with a floor, said base member having a center contact area adapted to be directly engaged with a bottom side of a motorcycle tire and a pair of horizontally extending leg parts joined to and projecting outwardly from opposite sides of the center contact area for providing stable and non-tipping supportive engagement with the floor;
- a pair of tire engaging uprights mounted adjacent opposite sides of said center contact area and cantilevered upwardly from said base member to define a tire-accommodating space therebetween which opens forwardly relative to the support stand to enable a tire of the motorcycle to be rolled into the space for contact with the center contact area;
- said uprights having sidewardly spaced lower end portions fixedly positioned adjacent opposite sides of said center contact area so that a lower portion of the tire, where it engages said center contact area, is closely sidewardly confined between said lower end portions;
- said uprights also having sidewardly spaced upper end portions defining thereon opposed inner side surfaces for sidewardly engaging the tire therebetween at a location above the elevation of the rotational axis of the tire;
- an adjusting structure cooperating with at least one of the uprights for permitting the width of the tire-accommodating space between the uprights to be adjusted to accommodate the width of the tire; and
- a releasable flexible securing strap transversely joined between said pair of uprights adjacent the upper ends thereof for restricting sideward separation between the uprights;
- the motorcycle tire being positionable within the tire-accommodating space with opposite side walls of the tire above the rotational axis thereof being sidewardly held between the upper end portions of the uprights and a lower part of the tire being engaged with the center contact area of the base member to impose at least that part of the weight of the motorcycle associated with said tire directly onto the base member.

15. A free-standing support stand adapted to be stationarily and stably supported in a free-standing manner on a generally horizontally extending floor for supporting a tire of a motorcycle to maintain the motorcycle in a stationary upright position, said free-standing support stand comprising:

- a horizontally extending base member maintained in supportive but non-fixed engagement with a floor, said base member having a center contact area adapted to be directly engaged with a bottom side of a motorcycle tire and a pair of horizontally extending leg parts joined to and projecting outwardly from opposite sides of the center contact area for providing stable and non-tipping supportive engagement with the floor;
- a pair of tire engaging uprights mounted adjacent opposite sides of said center contact area and cantilevered upwardly from said base member to define a tire-accommodating space therebetween which opens forwardly relative to the support stand to enable a tire of the motorcycle to be rolled into the space for contact with the center contact area;
- said uprights having sidewardly spaced lower end portions fixedly positioned adjacent opposite sides of said center contact area so that a lower portion of the tire, where it engages said center contact area, is closely sidewardly confined between said lower end portions;
- said uprights also having sidewardly spaced upper end portions defining thereon opposed inner side surfaces for sidewardly engaging the tire therebetween at a location above the elevation of the rotational axis of the tire;
- said upright having a generally u-shaped upwardly oriented configuration and including rear and front vertically-elongated legs which project upwardly in spaced but generally coplanar relationship, said rear leg projecting upwardly through a significantly greater vertical extent than said front leg, whereby the rear and front legs sidewardly engage the side wall of the tire at respective upper rear and lower front quadrants thereof; and
- an adjusting structure cooperating with at least one of the uprights for permitting the width of the tire-accommodating space between the uprights to be adjusted to accommodate the width of the tire;
- the motorcycle tire being positionable within the tire-accommodating space with opposite side walls of the tire above the rotational axis thereof being sidewardly held between the upper end portions of the uprights and a lower part of the tire being engaged with the center contact area of the base member to impose at least that part of the weight of the motorcycle associated with said tire directly onto the base member.

* * * * *